June 5, 1951  J. R. MONTAGUE  2,555,359
PILE STRUCTURE AND METHOD OF MAKING SAME
Filed Nov. 12, 1947  6 Sheets-Sheet 1
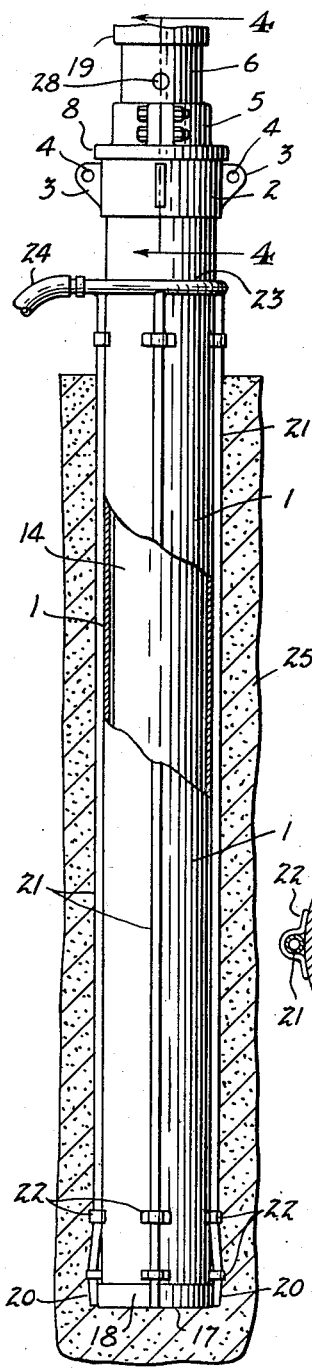
Fig. 1
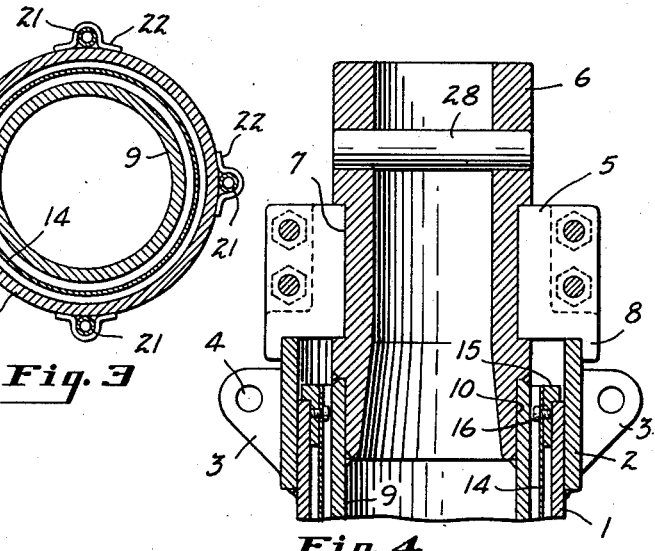
Fig. 2
Fig. 3
Fig. 4
INVENTOR.
John R. Montague
BY
Evans + McCoy
ATTORNEYS June 5, 1951  J. R. MONTAGUE  2,555,359
PILE STRUCTURE AND METHOD OF MAKING SAME
Filed Nov. 12, 1947  6 Sheets-Sheet 3

INVENTOR.
John R. Montague
BY
Evans & McCoy
ATTORNEYS

June 5, 1951   J. R. MONTAGUE   2,555,359
PILE STRUCTURE AND METHOD OF MAKING SAME
Filed Nov. 12, 1947   6 Sheets-Sheet 4

INVENTOR.
John R. Montague
BY
Evans & McCoy
ATTORNEYS

June 5, 1951   J. R. MONTAGUE   2,555,359
PILE STRUCTURE AND METHOD OF MAKING SAME
Filed Nov. 12, 1947   6 Sheets-Sheet 6

INVENTOR.
John R. Montague
BY
Evans & McCoy
ATTORNEYS

Patented June 5, 1951

2,555,359

UNITED STATES PATENT OFFICE 2,555,359

PILE STRUCTURE AND METHOD OF MAKING SAME

John R. Montague, Toronto, Ontario, Canada, assignor to Louis S. Wertz, Cleveland Heights, Ohio Application November 12, 1947, Serial No. 785,416

11 Claims. (Cl. 61—50)

This invention relates to foundation piles and more particularly to concrete piles either alone or in combination with apparatus for placing and forming such piles.

Piles are used for footings, foundations, and the reinforcement of buildings and other structures. Numerous schemes and devices have been evolved for making and placing piles. Some piles are preformed of wood, metal, or concrete, or combinations of these materials and are subsequently loaded, jacked, jetted or driven into place. Piles are also formed in place by lowering or driving a casing and subsequently filling the casing or the space thus provided with concrete or the like.

No one method has been found to be superior for all applications and all conditions that may be met in practice. Factors of soil condition, bearing depth, cost, and time available dictate variations in pile forming and setting or driving technique. Furthermore, it is quite costly and ordinarily not entirely satisfactory to operate with a large number of widely varying processes or with a great many different types of tools because of the difficulty of giving adequate training to personnel and the large inventory of equipment which must be carried.

It is therefore the principal object of the present invention to provide a generally improved method and apparatus for forming and placing concrete piles, the method being relatively simple and easily learned while yet providing suitable modifications or variations that can be employed in accordance with the requirements of conditions encountered in practice, the various modifications of the process being capable of performance with a minimum amount of equipment, simple in construction and relatively inexpensive to make and operate.

In its fundamental aspects the present invention contemplates the provision of a pile of tightly compacted aggregate material which is first formed in its ultimate shape and is then intruded with a fluid grout or highly flowable bonding agent which is forced under pressure into all spaces and interstices of the aggregate and permeates all portions of the formed pile and which upon solidification or hardening results in a dense pile of exceptionally high strength. The invention includes the making of such piles above ground and subsequently sinking or driving them into place but more especially provides for the preliminary driving or lowering of a casing or sheath into which the aggregate is subsequently introduced, compacted, and intruded to form the dense pile structure in its final or ultimate position. The sheath or casing provides a protection to the aggregate during placing and intruding thereof so as to prevent contamination by the surrounding soil or other medium and in the case of piles placed through fluid or semi-fluid stratum the casing or sheath prevents flowing away or loss of the aggregate or intrusion material during the formation of the pile. The invention further contemplates the provision of piles or pile structures of composite nature and multiple or parallel pile structures in which larger or increased areas of bearing are provided so that the piles can sustain greater loads without objectionable sinking or settling.

Other objects and advantages reside in particular combinations and arrangements of parts and in the various process steps all of which will become apparent as the description of suitable embodiments of the invention proceeds. This description is made in connection with the accompanying drawings in which:

Figure 1 is an elevational view partly in section and with parts broken away and removed showing a drive casing for a pile sunk in the earth and related apparatus of the character contemplated by this invention by means of which the pile is sunk or driven into the earth or ground;

Fig. 2 is a vertical sectional detail through the foot or bottom portion of the casing of Fig. 1 and enlarged with respect to that figure, this view also showing the internal drive mandrel and the relatively light weight metal sheath;

Fig. 3 is a sectional detail taken substantially on the line 3—3 of Fig. 2;

Fig. 4 is a fragmentary vertical sectional detail with parts removed through the upper end of the casing taken substantially on the line 4—4 of Fig. 1 and enlarged with respect to that figure;

Referring now to the drawings by numerals of reference which indicate like parts throughout the several views, the invention is described as embodied in a number of modifications including several types of apparatuses and a number of methods or processes in which they may be used.

Figure 5:
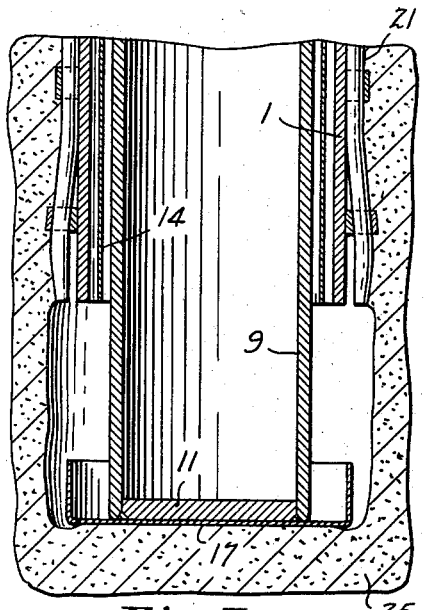
Figs. 5 and 6 are partly diagrammatic vertical sectional details similar to Fig. 2 through the bottom end of the pile sinking casing and the surrounding earth showing subsequent stages in the placing and making of a pile structure in accordance with the present invention.

In the process of making or forming a concrete pile in place in the ground, apparatus such as that illustrated in Figs. 1 through 8 may be employed to great advantage. This apparatus comprises a drive casing 1 which may be in the form of an elongated cylindrical tube of relatively heavy sectioned steel, the casing being from about 10 inches to about 36 inches in diameter although usually not more than about 24 inches in diameter and preferably about 20 inches in diameter. The casing is made in sections which may be up to 40 or more feet in length. Very short sections of from 3 to 5 feet in length may sometimes be used in cramped quarters with little headroom, as in underpinning work. In the open lengths of from about 40 feet to about 60 feet are preferred. One section is illustrated in the drawings, additional sections being added on in end to end relation by sleeve couplings or welding as the casing is driven or sunk into position. Additional sections may be added on sufficient to provide an ultimate casing as much as 150 feet or more in length. The wall thickness of the casing is preferably from about $\frac{5}{16}$ of an inch to about $\frac{5}{8}$ of an inch, depending upon the contemplated ultimate length of the pile to be made and the diameter of the casing. For most applications a wall thickness of about $\frac{1}{2}$ inch is satisfactory.

A collar 2 is telescopically received about the upper end of the casing 1, being secured by welding and projecting above the upper end of the casing so as to provide an internal socket for receiving a succeeding length of casing which may thus be positioned so that its lower end abuts the upper end of the first section of the casing. The collar 2 is provided with ears 3 having holes 4 which are utilized in lifting and manipulating the casing by means of a derrick and guide wires or lines.

A split driving collar 5 seats on the upper end of the coupling collar 2, the two halves of the driving collar being formed with abutting flanges that are bolted together to clamp the collar about a tubular driving head 6. The driving collar embraces a reduced diameter portion 7 of the driving head and has end engagement with the shoulders thereby provided to prevent relative axial movement of the parts. A depending circumferential flange 8 on the driving collar 5 embraces the upper end of the coupling collar 2 so as to center the driving head 6 with respect to the casing and the coupling collar.

Within the casing 1 is disposed concentrically a hollow tubular mandrel 9 which may be in the form of a relatively heavy sectioned steel tube the upper end of which is received on a reduced diameter bottom end portion 10 of this driving head 6 and is secured in place as by welding. As additional sections of mandrel are added in end to end relation by internal sleeve couplings during the sinking of the casing, the welding is cut or the upper end of the mandrel is severed from the driving head. The lower end of the mandrel is closed by a plug or plate 11 which may be welded in place to provide a substantially flat bottom on the lower end of the mandrel.

The mandrel 9 is of less diameter than the inside of the casing 1 providing an annular space throughout the length of the casing which receives a tubular sheet metal sheath or shell 14. This shell, which may be made of dipped or plated rolled steel of about 16 to about 20 gauge, preferably about 18 gauge, is approximately coextensive in length with the drive casing and mandrel and ultimately forms the protective sheath for the completed pile. At its upper end this shell 14 is embraced by a flanged collar 15 to which it is secured by screws 16. The flange of the collar 15 seats on the upper end of the drive casing 1 within the coupling collar 2 so as to support the shell 14 during the manipulation and sinking of the casing. As the driving of the casing progresses and additional sections of casing and mandrel are added in end to end relation, additional sections or lengths of the sheath 14 are lengthwise added to one another in end to end relation. The ends of the successive sheath sections are abutted and connected together by coupling collars.

The foot or bottom end of the casing assembly is closed by a cover or cap 17 which may be in the form of a substantially flat sheet metal member having an upstanding peripheral flange or skirt 18. The cap may be made by a stamping process or it may be fabricated from separate parts by welding. The circular flange 18 prior to assembly may be sprung or bent inwardly at different points about its circumference so as to frictionally grip the outside of the casing 1 to retain the cap on the end thereof. Thus the cap serves as a closure for the bottom of the casing preventing objectionable amounts of earth or other material from entering the interior of the casing during the sinking of the latter. Great strength is not required in the cap since it is internally braced or reinforced by the bottom plate 11 of the mandrel 9 which takes the strain off the driving or jacking action used to sink the pile casing.

If a relatively short pile is to be sunk into soft earth such as silt, clay or loam, the casing may be driven into place by blows on the top of the driving head 6. Such blows may be administered by a conventional pile driver having a vertically reciprocable hammer indicated at 19. A wood or rope cushion, not shown, is customarily placed atop the driving head 6 to soften the hammer blows.

In relatively dense or granular soils, such as clays or sands, the sinking of the pile casing is more readily accomplished by jetting. This operation is accomplished by forcing a suitable fluid such as water or air or both either together or in succession through nozzles 20 located in circumferentially spaced positions about the bottom of the casing. The nozzles are disposed on the outside of the cap flange 18 and arranged to direct fluid jets angularly under the bottom of the pile so that the high pressure fluid ejected from the nozzles serves to wash or force the earth underlying the cap 17 from the bottom of the pile. The jetting fluid is supplied to the nozzles 20 through longitudinal pipes 21 extending along the length of the casing and secured to the outside thereof as by straps 22 welded or otherwise attached (as by screws for facile removal) to the casing.

The upper ends of the pipes 21 are connected into a manifold 23 and a flexible conduit or hose 24 carries the high pressure jetting fluid to the casing manifold from a suitable source. Provision is made for extending upwardly the conduit 24 or, preferably, the pipes 21 as additional sections of the casing 1 are added in end to end relation during the sinking thereof.

In sinking a pile casing using fluid jets, pressure as by jacking or loading or hammer blows as by a pile driver may be applied to the driving head 6 to assist in forcing the structure downwardly into the earth, designated at 25. The earth loosened at the bottom of the casing structure by the action of the fluid jets or the pressure or both is entrained by the fluid and carried upwardly along the outside of the casing 1 and out through the top of the opening for the casing provided in the earth. In driving piles to any considerable depth and even relatively short piles in hard or dense earth the use of fluid jets is extremely desirable not only because of the greater ease of driving but because the earth surrounding the pile is less disturbed and danger to adjacent buildings and foundations is minimized.

In sinking the pile casing 1 the driving head 6 is loaded, jacked or driven by the hammer 19 simultaneously with the jetting action of the high pressure fluid forced through the nozzles 20 at the bottom of the casing. The loading or hammering of the casing disturbs the earth at the bottom of the casing, causing it to shift or move so that it is readily picked up and entrained in the jetting fluid, which removes it from the bottom of the casing and carries it upwardly through the top of the hole being excavated.

Figure 6:
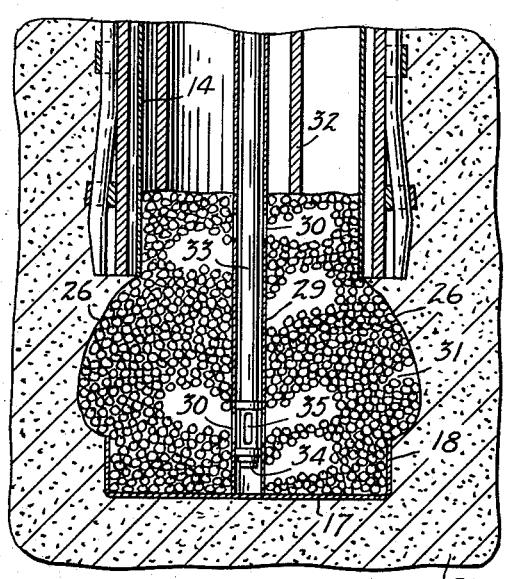
Figure 7:
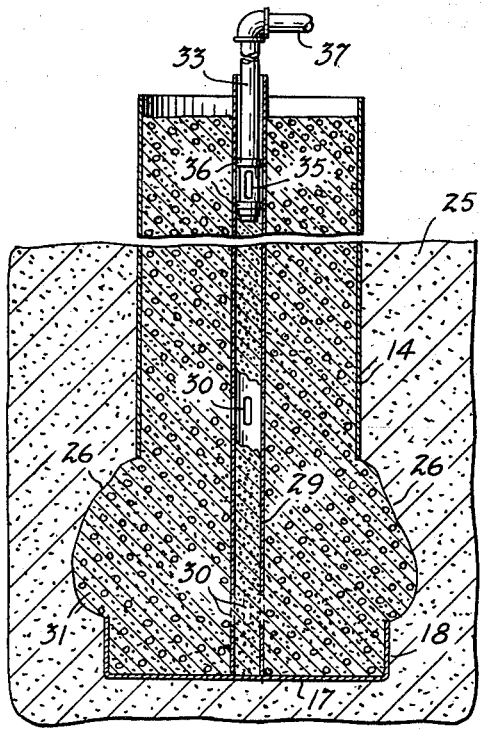
Fig. 7 is a partly diagrammatic, foreshortened vertical sectional detail with parts removed showing one of the final stages of the pile placing process, the lower portion of this figure corresponding to the illustrations of Figs. 2, 5 and 6.
Figure 8:
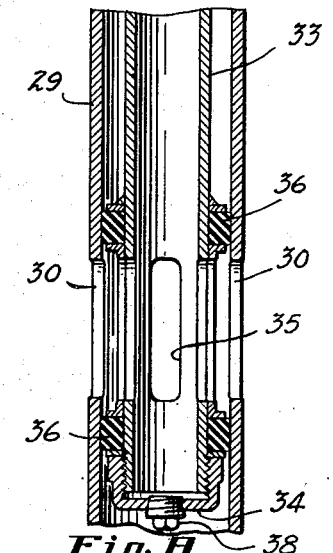
Fig. 8 is a sectional detail with parts broken away and removed illustrating the intrusion pipe used for placing grout at any desired level in the pile during the intruding of the latter.

The building of a pile in place and in accordance with the method of the present invention and utilizing the apparatus previously described is illustrated diagrammatically in Figs. 5 through 7, which show successive steps in the pile forming or building process.

After the casing assembly or structure, including the mandrel 9 and the sheet metal sheath 14, has been driven or jetted into place to the desired depth in the earth 25, an enlarged cavity for a base or footing may be formed at the bottom of the casing and between the latter and the cap 17. A convenient method of providing this enlarged cavity is to elevate or lift the casing 1 while maintaining a load or pressure on the driving head 6. In this operation, the split driving collar 5 is removed from about the head 6, and the casing 1 is lifted by means of a hoist or derrick, the lines of which are connected to the ears 3 of the casing collar 2. A load to hold the mandrel 9 in the driven position may be applied by allowing the drive hammer 19 or an extension thereof to rest on the top of the head 6 during the raising of the casing 1. As the casing is raised while the mandrel is held down, the latter forces the cap 17 off the bottom of the casing, holding the cap at the bottom of the hole as shown in Fig. 5.

When the casing 1 and the shell 14 have been thus elevated about a foot or two, depending upon the size of the casing, the lifting being an amount approximately equal to or slightly less than the diameter of the casing, the jetting fluid which had been turned off during the raising of the casing is again ejected through the nozzles 20 to enlarge the opening or excavation at the bottom of the casing. During this operation, some of the earth washed out or excavated may be flushed upwardly through the interior of the casing 1 through the space between the mandrel 9 and the sheath 14; or the mandrel 9 with the driving head 6 may be removed to facilitate the flushing upward of the excavated earth. Some earths, such as sands might otherwise cause binding between mandrel and sheath by lodging of particles in the annular space. This supplemental jetting is continued until the bottom excavation is enlarged to a diameter substantially greater than that of the cap 17, as indicated by irregular lines 26 (Fig. 6).

As an alternative method of providing the clearance between the bottom of the casing 1 and the cap 17, the split driving collar 5 may be removed from about the driving head 6 when the casing structure is approximately at the desired depth. Continued pressure or blows on the driving head 6 accompanied by jetting action of fluid through the nozzles 20 then serves to sink the mandrel 9 and the cap 17 to a depth lower than the casing 1 substantially to the position illustrated in Fig. 6. This alternate method eliminates the operation of lifting the casing 1 prior to the jetting of the enlarged base cavity and can be used when the earth 25 is relatively soft and readily displaced.

Before or after the jetting out of the earth at the bottom of the pile to provide the enlarged base or footing cavity the mandrel 9 is withdrawn leaving in position the sheath 14, protected by the casing 1 from the pressure of the surrounding earth, and the cap 17 on the bottom of the casing. The mandrel is withdrawn by a hoist or derrick connected to a crosspin 28 secured in the driving head 6. Complete removal of casing 1 before filling shell 14 with tamped aggregate might result in the collapse of the unfilled shell from pressure of the surrounding earth. According to the present invention casing 1 is left in position so that the bottom thereof is always below the top of the progressively placed aggregate to provide protection to the shell until the latter is filled with well-tamped aggregate to provide support against collapse. The casing is progressively withdrawn as aggregate is placed.

The casing 1 is separately withdrawn in progressive stages by means of the ears 3. As aggregate is introduced into the shell 14 and tamped, the casing 1 is withdrawn so that the bottom of the casing is at or just below the level of the top of the tamped aggregate. Thus the casing prevents crushing of the shell 14 by external pressure.

The filling of the sheath 14 with aggregate to make a monolithic concrete column is preferably performed in a series of successive steps, especially in the case of a relatively long pile. A grout distributing tube 29 is lowered axially through the sheath 14 until it rests on the cap 17 at the bottom of the excavation. This tube is positioned centrally in the sheath and at vertically spaced intervals along its length is formed with lateral openings or foramina 30 which are preferably in the form of elongated slots. A quantity of aggregate, indicated at 31, is lowered through the sheath 14 and tamped firmly into place as by a tubular tamping tool 32 which is vertically reciprocated in the sheath and against the top of the aggregate. The tamping tool has a diameter slightly greater than half that of the sheath 14 so that the tool can be moved laterally to all different positions within the sheath in compacting the aggregate 31. A sufficient quantity of aggregate is initially introduced so as to fill the enlarged base cavity at the bottom of the pile and to extend up into the interior of the sheath 14 from the bottom thereof.

An alternative technique for forming a pile involves the sinking, by one of the methods described, of the casing 1 and the mandrel 9, the cap 17 being disposed across the bottom end of the casing as previously explained. The shell 14 is omitted from the assembly during the sinking of the casing. When the casing and mandrel have been driven to the desired depth the mandrel 9 is withdrawn leaving the empty casing in the hole. The grout distributing tube 29 is then lowered into the casing until it rests against the bottom cap 17. An initial quantity of aggregate is then placed in the bottom of the casing and the shell 14 is inserted into the casing to rest on the top of the aggregate. There after, additional aggregate is placed and tamped in successive layers or batches in the shell until it is filled to the top, as described in connection with Fig. 6. The casing 1 is withdrawn either after all the aggregate is placed or progressively as it is placed, the casing providing at all times protection to the unfilled portion of the shell. The aggregate fills the hollow cap 17 and the large diameter cavity in the earth at the bottom of the shell so that the flat bottom of the bulbous concrete base resulting from the subsequent intrusion of the aggregate is encased in the cap. The cap extends across the bottom of the pile column and is continuous up the sides of the base a short distance, the concrete of the base being embraced by the flange 18 of the cap. Thus the concrete base is protected by the caps from erosion and attack by the surrounding earth and percolating waters and is given a flat bottom.

Following the introduction and tamping of the first or initial quantity of aggregate, additional quantities are introduced in succession, each being individually tamped in the manner described. By thus introducing the aggregate, which is in the form of graded stones, gravel, sand, and the like, in batches, and then tamping each batch individually, the entire aggregate mass so placed in the sheath 14 is densely compacted. Since there is no cement or binding agent yet introduced, the tamping and introduction of aggregate can be performed with painstaking care without danger of disturbing partially set cement in the lower regions of the pile structure.

After the enlarged base cavity and the entire length of the sheath 14 are filled with compacted aggregate a fluid grout highly flowable in character is introduced or intruded into the aggregate under high pressure. A suitable grout is that disclosed in United States Patent No. 2,313,107 issued March 9, 1943, and is preferably introduced from the bottom upward. An intruding tool comprising a pipe or conduit 33 smaller than the tube 29 is inserted through the latter to the bottom of the mass of compacted aggregate. The lower end of the grout conduit 33 is fitted with a cap 34 to prevent the flow of grout through the end of the pipe and a number of elongated slots 35 formed in the grout pipe adjacent the end thereof permit grout under pressure to flow radially out of the end of the grout pipe into the tube 29. Above and below the slots 35, the grout pipe 33 is fitted externally with deformable bushings or packings 36 which may be in the form of rubber rings that embrace the pipe and are held in place and axially compressed between washers or collars welded in place or held by threaded fittings. The bushings 36 have sliding engagement with the interior walls of the tube 29 to effect a seal therewith and confine grout in the space between the bushings and in the region of the grout discharge slots 35.

The discharge end of the grout pipe 33 is positioned approximately as shown in Fig. 6 so that the slots 35 are adjacent the bottom of the grout distributing tube 29 and in alignment with some of the slots 30 of the distributing tube. A liquid grout of the character identified above and in a highly flowable condition is introduced into the upper end of the grout pipe as through a connecting conduit 37 so that the grout is forced to flow into the compacted aggregate disposed in the enlarged footing at the bottom of the sheath 14. The grout flows radially outwardly from the lowermost slots 30 of the grout distributing pipe, filling the voids and interstices in the aggregate. The bushings 36 confine the grout in the tube 29 so that initially it is supplied directly only to the lower portions of the aggregate. To intrude the bottommost (or lowermost) zones of the aggregate adjacent to the cap 17 the lower end of the grout conduit 33 may be opened by the temporary removal of the cap 34 and the conduit lowered to the bottom, or a threaded plug 38, which may be provided in a centrally located threaded hole in cap 34, may be temporarily removed in order to achieve this same objective.

The pressure exerted on the grout, either continuously or in the form of impulses, to force the same into the aggregate is not critical and is determined by the particular conditions existing at the site. In each case and at the different elevations of each pile the pressure used is less than that which would cause the sheath or aggregate or both to be disturbed or raised out of position. Relatively shallow piles, piles in soft earth or soil, and the upper portion of long piles may only require pressures of the order of about twenty pounds per square inch, while relatively long piles, especially in hard earth or soil, may require at their bottom ends pressures as high as about two hundred pounds per square inch or more, for satisfactory and complete intrusion or grouting.

In the initial intrusion step the grout is forced to flow into the aggregate through the lowermost openings 30 of the distributing tube, or out the bottom of such tube, until refusal or until a predetermined pressure has been reached. Some of the grout may flow upwardly through the aggregate to the vicinity of the next group of outlet slots 30 of the foraminous grout distributing tube. The grout may also flow beyond the zone of the compacted aggregate which comprises the enlarged foot or base portion of the pile and into the surrounding earth beyond the line 26 shown in the drawings. When the surrounding earth consists of gravel, coarse sand or similar intrudable material, the intrusion of the grout beyond the zone of the enlarged base is beneficial and serves to further increase the effective size of the footing, making a relatively large monolithic base integral with the finished pile.

After the intrusion of the grout through the lowermost group of slots 30 in the distributing tube 29, the grout conduit 33 is raised so as to position the outlet slots 35 thereof in line with the next higher group of slots 30 in the distributing tube. Grout is then introduced through this next higher group of slots into the compacted aggregate within the shell 14 and the intrusion process is continued until a predetermined grout level is reached. Thereafter the intrusion pipe 33 is again elevated to align the outlet slots 35 therein with the next group of distributing slots 30 of foraminous tube 29 and the intrusion process again repeated. Above the bulbous base no great pressures are necessary, the grout flowing freely upward through the voids between the aggregate particles which consist preferably of sizes ranging from a minimum of about 3/8 inch to a maximum of about 1½ inches or in some cases, as with very large diameter piles, possibly up to 3 inches. Intrusion of grout is thus repeated in stages throughout the length of the shell 14 and until the liquid grout appears in the compacted aggregate at the top of the shell. Intruding from the bottom up in the manner described permits air, gas, water and other liquid to be displaced upwardly through the shell and released out the top. Fluids so displaced may also flow into the tube 29 through the slots above the lower end of the conduit 33 and be released through the upper end of the tube.

After completion of the grouting in the manner described, the grout conduit 33 is withdrawn from the foraminous metal pipe or tube 29, the latter remaining in and becoming a part of the completed pile structure. The tube is effectively interlocked in the pile columns by the lateral openings 30 which are filled with the concrete of the pile. If desired, aggregate and grout may be introduced into the tube 29 to fill the same with a concrete-like mix to further strengthen the structure.

The method of the present invention is particularly well suited to the casting or forming of piles in earth containing or subjected to subterranean waters. The formation of strong concrete piles under ground is ordinarily difficult when muddy or other type of contaminated water reaches the aggregate or concrete prior to hardening of the pile, or flows into or through the aggregate prior to the intrusion thereof in the type of pile that is formed by intruding grout into previously placed aggregate. One expedient is to pump the contaminated water out of the pile casing before, during or after the placing of the aggregate, but even when such steps are taken, any muddy coating that is left on the particles of the aggregate interferes with the formation of effective bonds so that the resulting structure is not as strong as it would otherwise be. According to the present invention, the following procedure is followed when muddy or otherwise contaminated subterranean waters are encountered:

During the placing of the aggregate as previously described, fresh water is pumped into the bottom of the excavation and into the aggregate through the tube 29, using a conductor such as the grout conduit 33 for the purpose of carrying the fresh water to the bottom. The fresh water thus introduced flows upwardly through the excavation inside of the metal shell or sheath 14, thus carrying mud and muddy water with it and thoroughly washing the compacted aggregate. This flushing out of the excavation can, according to one plan, be started prior to or after the placement of the initial quantity of aggregate and is done continuously during the placing of the remainder of the aggregate. According to another plan, all the aggregate is first placed and compacted in the sheath, and the fresh water is then flushed upwardly therethrough.

The flushing is continued until the grouting or intruding is to be done. At such time, without substantial interruption in the flow, the highly flowable grout such as that previously mentioned is introduced through the grout conduit 33 and the tube 29 in the manner previously described, first into the bottom portion of the compacted aggregate and then progressively upward therethrough. The incoming grout displaces upwardly the fresh water in the excavation without objectionably intermingling or being diluted thereby. Thus, as the grouting proceeds, the fresh water is forced out through the top of the casing or sheath and is immediately replaced by the incoming cementitious grout. The inflowing of the grout is continued until all of the fresh water has been displaced and the pure grout appears at the top of the compacted aggregate in the sheath. This process prevents objectionable contamination of the compacted aggregate by ambient subterranean muddy waters and results in a dense concrete structure of uniform strength.

A pile constructed in accordance with the process described is a monolithic concrete column and may be used alone or grouped with others to provide suitable foundations for buildings, bridges and the like. The upper end of the pile may be fitted with a suitable cap in accordance with conventional practice.

One of the distinct advantages of the present process is the arrangement whereby a multiplicity of piles may be located in relatively close proximity to one another with a minimum disturbance of one another or the surrounding earth, and at low cost. If, for example, a set of piles is to be sunk into the earth in closely spaced relation for the purpose of providing a footing such as in a bridge pier construction, it is contemplated to sink all of the shells 14 and fill them with compacted aggregate before any grout whatsoever is introduced. Once filled with compacted aggregate the shells are effectively protected against collapse such as sometimes occurs with open or unfilled shells due to external earth pressure or the driving of adjacent piles. Any minor distortion which may occur is harmless and is completed before the grout is introduced to form damageable concrete. The several shells may be sunk or driven simultaneously, or if only a single drive casing 1 and mandrel 9 is available, the shells may be sunk into position one at a time. The work of sinking the shells and filling them with aggregate and compacting the same may be done in a progressive manner which is very economical. After the desired number of pile shells have been sunk into position and filled with compacted aggregate, the grouting by means of one or more of the grout conduits 33 is performed in a single operation. If equipment for supplying but a single grout feeding conduit is available, the several piles are intruded sequentially in the manner described. However, if a grout supply of sufficient capacity is available, all of the piles are intruded in a simultaneous operation so that the grout fills the several pile shells simultaneously from the bottom up.

By the process described, the work on the group of piles may proceed continuously substantially without interruption, thus effecting a considerable economy in labor. The compacted aggregate with which each of the shells 14 is filled immediately after the lowering or driving thereof prevents collapse of the shell under pressures that may be exerted on the side walls by the surrounding earth or during the driving of a subsequent pile in the near vicinity. However, the shaking and distortion to which the compacted aggregate may be subjected in one pile during the driving of an adjacent shell or casing does not have the deleterious effect on the unbonded aggregate such as might be encountered with the use of a pre-mixed concrete mass poured into the shell. The intrusion of all of the piles in a single sequential or simultaneous operation which is performed subsequent to all of the driving, jetting or jacking that may be necessary to sink the several casings or shells avoids the possibility of cracking or damaging partially hardened or set concrete.

Figure 9:
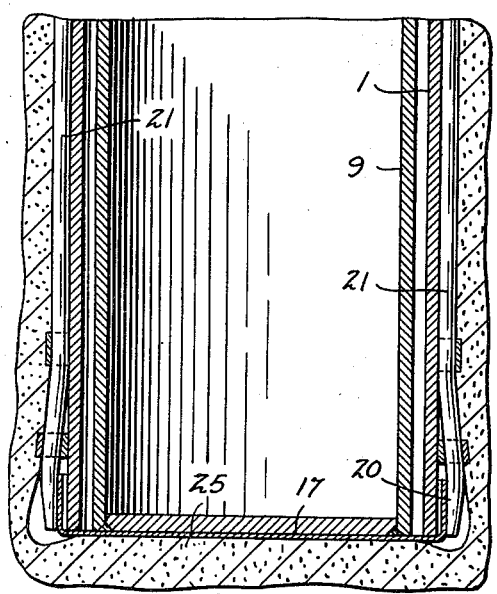
Figs. 9, 10 and 11 are partly diagrammatic, vertical sectional details through the lower end of a pile casing and the surrounding earth showing apparatus used and a series of stages in the placing of a pile in accordance with a modified version of the present invention.
Figure 10:
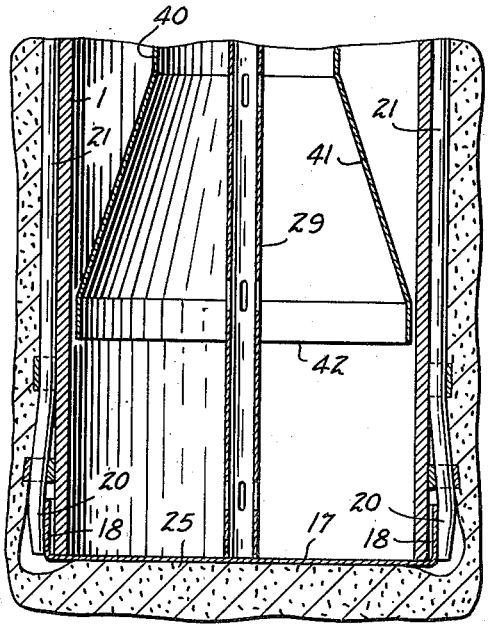

In Figs. 9 through 12 is illustrated a modification of the invention in which a relatively thin sectioned sheet metal shell 40 of relatively smaller diameter than the shell 14 (previously described) is employed in lieu of the latter. In this modification, the small diameter shell reduces the quantity of aggregate required and is useful when the loads to be sustained do not require a heavy section throughout the length of the pile. As in the case of the protective shell 14 previously described, the shell 40 is made of rolled sheet metal such as plated or hot dipped iron of about 16 to about 20 gauge, preferably about 18 gauge. The bottom end of the shell 40 is formed with a flared or bell-shaped portion 41 which may terminate in a depending cylindrical skirt portion 42. The diameter of the skirt 42 is less than the interior diameter of the casing 1, as shown in Fig. 10.

Figure 11:
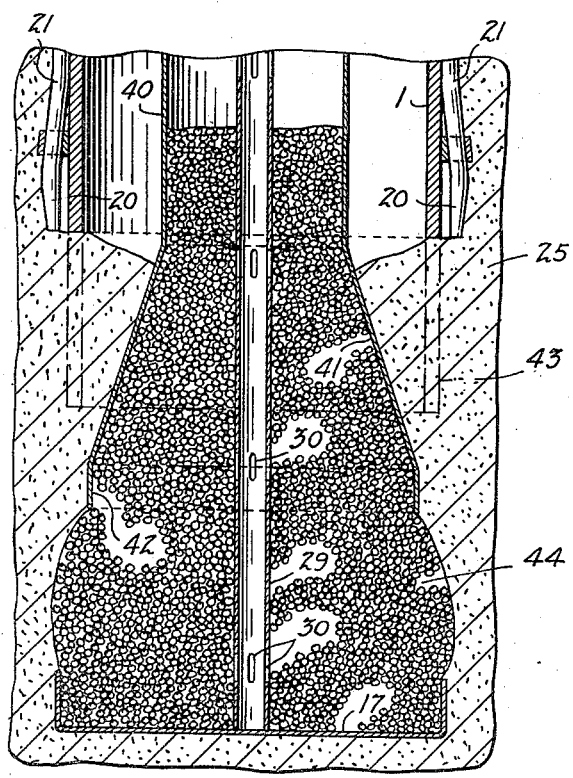
Figure 12:
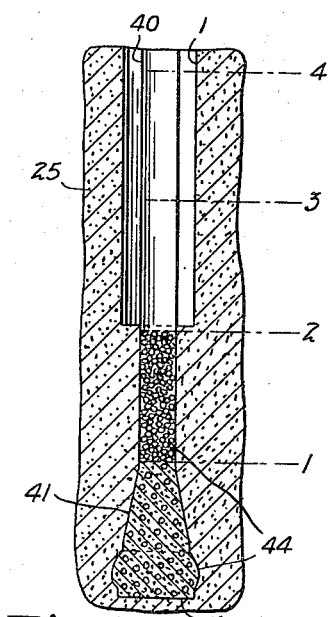
Fig. 12 is a diagrammatic vertical section through a pile structure and surrounding earth illustrating the sequence of steps employed in the present process for filling a metal pile sheath with aggregate and subsequently intruding the same to form a composite pile.

In forming a pile utilizing the apparatus shown in Figs. 9 through 11 the casing 1 and the mandrel 9 having the end sealing cap 17 placed thereon in the manner previously described, but without a shell, are driven, forced, or jetted into place. After the casing has been sunk to the desired depth in the earth 25, the mandrel 9 is withdrawn and the shell 40 lowered into the casing 1 to a position such as that illustrated in Fig. 10 in which the bottom of the skirt 42 is spaced upwardly from the cap 17 a distance approximately but preferably slightly less than the diameter of the cap. The grout distributing tube 29 is then lowered centrally through the casing 40 and into contact with the cap 17 at the bottom of the excavation. An initial quantity of aggregate introduced into the bottom of the casing or excavation through the shell 40 fills the space between the cap 17 and the shell 40, preferably extending a short distance up into the cylindrical portion of the shell, as shown in Fig. 11. This initial quantity of aggregate serves to support the shell by engaging the bell portion 41 thereof, permitting the casing 1 to be lifted so that the bottom of the casing is above the level of the bottom of the shell as indicated by broken lines 43 (Fig. 11).

With the initial quantity of aggregate indicated at 44 serving as an internal support for the shell, the casing 1 is reciprocated up and down to tamp the earth around the outside of the shell. During this tamping, backfilling earth may be introduced into the excavation through the top of the casing and into the space between the casing and the shell 40. When the earth or backfill has been tamped by the casing 1 around the outside of the shell 40 approximately to the level of the top of the initial charge of aggregate on the inside of the shell, or to the level at stage (1) Fig. 12, a succeeding or second charge of aggregate is introduced into the interior of the shell 40 raising the level thereof approximately to the line indicated at stage (2) Fig. 12. The casing 1 is then reciprocated over a short path at a higher level while backfill is introduced into the excavation around the shell 40 so as to raise the level of the backfill approximately to that of the second charge of aggregate on the inside of the casing, or approximately to the level of stage (2) Fig. 12. This alternate charging of aggregate into the interior and compacting of the earth or backfill around the outside of the shell is repeated in successive stages until the shell 40 is filled with aggregate throughout its length and the earth or backfill is compacted around the outside of the shell throughout its length.

As an alternative to the above procedure, when driven into fluid or semi-fluid earth, the pile may be formed by lowering the shell 40, 41, 42 to the bottom so that the depending cylindrical skirt 42 rests on the sealing cap 17, and, after placing the grout distributing tube 29, an initial quantity of aggregate is introduced into the bottom of the shell preferably extending a short distance up into the cylindrical portion 40 of the shell. Tamping and adding of aggregate and backfilling of earth in sequence is then carried out as previously described.

The aggregate is thereafter intruded by a suitable highly flowable grout, such as that previously mentioned. The grout is introduced into the aggregate as previously described through conduit 33 and the grout distributing tube 29. The pile resulting from this modified arrangement has a relatively large foot portion and the bottom of the foot is substantially flat as formed by the cover 17. The tapered section of the pile formed by the bell 41 of the shell insures a gradual transition from the relatively broad, wide base to the relatively small section of the pile formed by the main portion of the shell 40.

Figure 13:
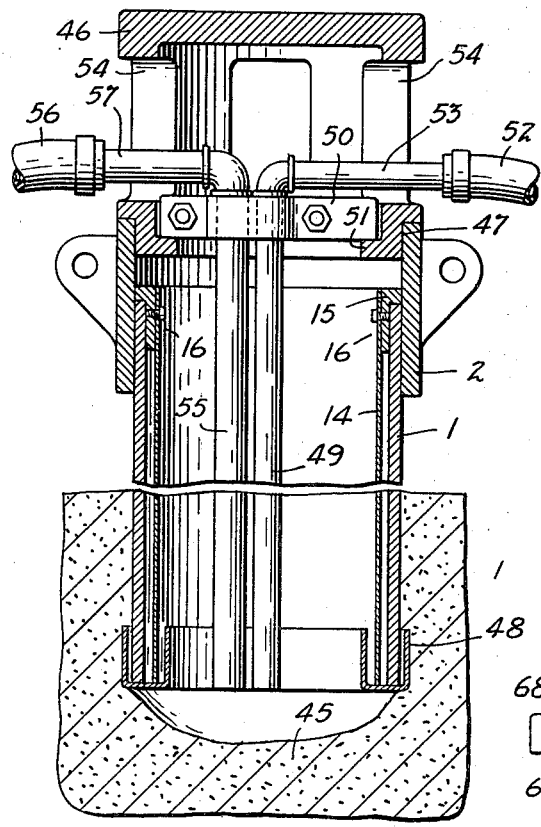
Fig. 13 is a partly diagrammatic vertical foreshortened sectional view showing a further modification of the pile placing or building apparatus of the present invention.
Figure 14:
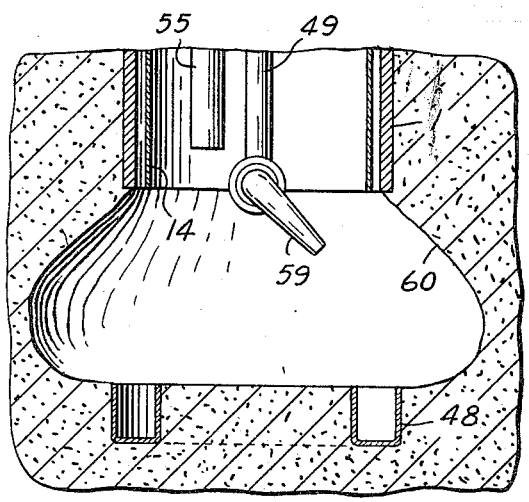
Fig. 14 is a partly diagrammatic, fragmentary sectional detail with parts removed showing a subsequent stage in the operation of placing or forming a pile using the apparatus of Fig. 13.

In certain soils, such as dense clay, silt or sand, it is desirable to sink or lower the casing 1 by internal jetting accompanied by loading or driving. Apparatus for such an arrangement is illustrated in Figs. 13 and 14 wherein the lower end of the casing is shown embedded in the body of clay, silt or sand type earth 45. In this modification of the invention the mandrel 9 is omitted and the driving head 46 is carried by the coupling collar 2 of the casing 1. This driving head is of hollow construction having a solid top to receive the loads of the pile driver hammer or the pressure of driving jacks. The lower end of the driving head is formed with a reduced diameter portion 47 which is slidingly received within the upper end of the coupling collar 2, the end of the reduced diameter portion providing a circumferential shoulder which bears against the upper end of the coupling collar and transmits the driving force thereto.

A circular driving cap 48 of ringlike form and U-shaped in radial cross section is received over the bottom ends of the casing 1 and the thin sheet metal shell 14. Laterally bent portions of the driving cap flanges frictionally engage the casing or the shell or both to retain the cap in place during the driving.

The jetting is accomplished by a high velocity stream of water or air or both or other suitable fluid introduced into the bottom of the casing in the region of the driving cap 48 through a conduit 49. This conduit is clamped adjacent its upper end between cross elements 50 supported on inturned flanges 51 formed on the lower end of the driving head 46. The jetting fluid is supplied to the conduit 49 under high pressure through a flexible conduit 52 and a rigid conduit 53, the latter extending through one of a number of lateral openings 54 formed in the side walls of the driving head 46.

The high pressure jetting fluid ejected through the bottom of the conduit 49, preferably through a suitable laterally directed nozzle (not shown) fixed on the conduit, impinges against and loosens the clay soil at the bottom of the casing, mixing therewith and forming a suspension which is drawn off largely through a discharge or suction conduit 55. This suction conduit, preferably slightly larger than the jetting conduit 49, has a screened opening at its bottom adjacent the casing end and extends upwardly through the casing, being clamped between the cross elements 50 at its upper end. A flexible conduit 56 and a rigid conduit 57, the latter extending through one of the lateral openings 54 in the driving head 56, connect the upper end of the exhaust conduit 55 to a suitable suction device which draws off the liquid soil suspension as the jetting proceeds. During the jetting the interior of the shell 14 is partially filled with the jetting liquid or the soil suspension. However, the extension of the exhaust conduit 55 to adjacent the bottom of the casing provides for the continuous drawing off of the heaviest or densest portion of the suspension.

The casing is forced into the ground by pressure applied on the top of the driving head 46. Driving pressure may be applied by jacking loading, or by a pile driver hammer. The driving of the casing may be alternated with the jet action, although preferably the casing is loaded or driven while the high pressure fluid jetting takes place.

When the casing has been driven to the desired depth, it may be partially withdrawn leaving the driving cap 48 in the bottom of the excavation. An adjustable nozzle 59 is then fitted on the bottom of the jet conduit 49 and arranged to direct the force of the liquid stream against the side walls of the excavated cavity at the bottom of the casing. This laterally flowing jet excavates a relatively wide cavity at the bottom of the casing as indicated by line 60 (Fig. 14). This large cavity, greater in diameter than the shell 14, is filled with aggregate and intruded to provide a broad base or footing on the bottom of the pile. An initial quantity of aggregate is placed in the cavity at the bottom of the casing through the open top of the latter after the jetting and exhaust conduits 49 and 55 are withdrawn and the driving head 56 is removed. This initial quantity of aggregate supports the shell 14 so that the flanged ring at the top may be disconnected therefrom and the casing 1 withdrawn progressively as additional batches of aggregate are placed in the shell and tamped. Thereafter the aggregate is intruded to provide a monolithic bulbous based pile having a substantially flat bottom.

In explaining that the bottom of the enlarged base is substantially flat, it is pointed out that the use of the metal cap 48 in this embodiment of the invention and the cap 17 (previously described), which act as shields for the earth in the bottom of the cavity, prevents or retards excavation of the cavity bottom by jetting during the formation of the large bulbous base cavity. The resulting broad relatively flat bottomed base or footing is extremely advantageous in pile structures because of the improved bearing and load supporting characteristics that result.

For use under conditions of extreme loads or in corrosive soil, it may be desirable to use, in lieu of the shell 14, a relatively heavy steel casing which is left permanently in place to contain the intruded aggregate and to protect the latter from contamination by the soil. A steel casing of this type may be driven or sunk by means of the apparatus previously described in connection with Fig. 13, the shell 14 and the cap 48 being omitted. The lower end of such a casing is indicated at 62 (Fig. 15) which shows the casing being sunk into the clay 45 by jet action through the jetting conduit 49 and the exhaust conduit 55. The heavy casing is filled with aggregate and intruded in the manner previously explained.

The relatively heavy sectioned steel casing 62 employed as a permanent part of the pile permits intrusion of the compacted aggregate under extremely high pressures such as from about 200 pounds per square inch to about 600 pounds per square inch. Such a permanent pile casing may have walls from about $\frac{5}{16}$ inch to about $\frac{5}{8}$ inch in thickness and may be filled and intruded above ground to be later sunk or driven as a completed unit.

Figure 16:
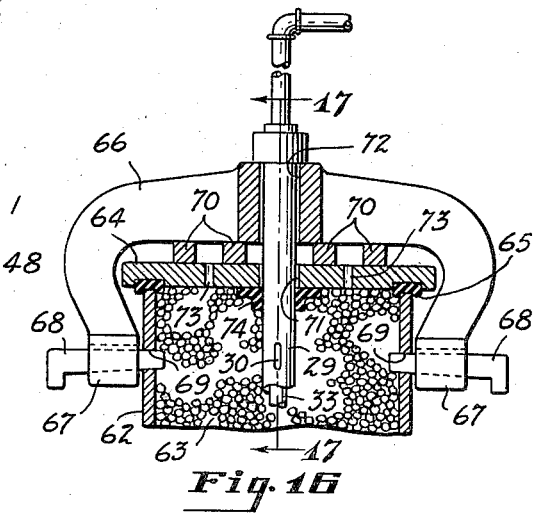
Fig. 16 is a fragmentary sectional detail through the upper end of a heavy sectional tubular steel casing showing capping apparatus for sealing the end of the casing to permit intrusion thereof by grout under high pressure.
Figure 17:
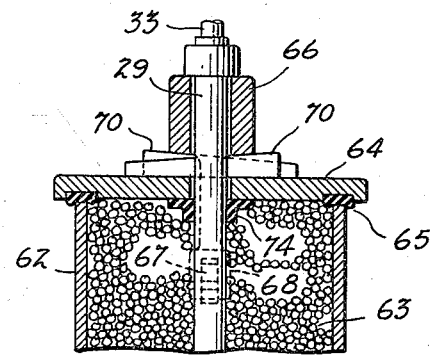
Fig. 17 is a sectional detail taken substantially on the line 17—17 of Fig. 16.

A suitable arrangement for high pressure intrusion thereof when sunk into place in the earth is indicated in Figs. 16 and 17. The upper end of the casing after the casing is filled with compacted aggregate 63 is fitted with a cover plate 64. A deformable ring gasket 65 fitted in an annular groove formed in the underside of the cover plate 64 engages the upper end of the casing 62 around the entire circumference of the latter to form a seal therewith.

A U-shaped member or bail 66 is disposed across the end of the casing over the cover plate 64 and has depending leg portions which are formed at their ends with apertured bosses 67. The apertures in these bosses are aligned to slidingly receive pins 68, the ends of which are receivable in diametrically disposed openings 69 formed in the casing 62 to securely fasten the bail 66 to the casing. Wedges 70 are driven between the cover plate 64 and the bail 66 from opposite sides of the latter to clamp the cover plate against the end of the casing 62.

In the center of the cover plate 64 is an opening 71 which is aligned with an opening 72 formed in an enlarged central portion of the bail 66. The foraminous grout distributing tube 29 having the slots 30 at intervals along its length is positioned centrally in the casing 62 prior to the introduction of the aggregate 63 therein and extends through the aligned openings 71 and 72 in the cover plate and bail. A deformable or rubber sealing ring or gasket 74 embraces the tube 29 just below the cover member 64 to seal the opening 71. The grout conduit 33 having the grout confining bushings 36 is inserted through the top of the tube 29 and highly flowable liquid grout is introduced therethrough and through the tube 29 into the aggregate under very high pressure such as 200 to 600 pounds per square inch.

The grout is preferably intruded first at the bottom or end of the pile remote from that illustrated in Figs. 16 and 17 and thence progressively along the length of the pile through different or successive openings 30 in the grout distributing tube 29, the grout conduit 33 being moved axially through the tube to position the outlet end of the grout conduit opposite different openings along the length of the foraminous tube 29. Small openings 73 are provided through the cover plate 64 to permit the escape of air and gases displaced by the grout intruded into the aggregate. These openings are sufficiently small to avoid substantial loss of intruding pressure therethrough when the casing 62 is completely intruded and filled with aggregate and grout. When the intrusion is started at the remote or bottom end of the casing 62 and carried on progressively along the length thereof, the appearance of liquid grout in the opening 73 serves as an indication that the intruding operation is completed. The openings are then plugged and pressure maintained on the tube 29 after withdrawal of the conduit 33.

Maintaining pressure on the grout is beneficial in several respects. Grout penetrates any porous material at the base of the pile and displaces any soft earth which may remain adjacent to the base. Pressure also makes denser, stronger concrete.

Figure 15:
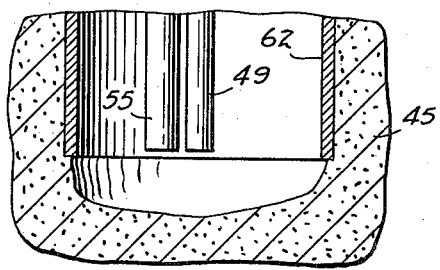
Fig. 15 is a partly diagrammatic sectional detail through the bottom of a heavy steel drive casing such as that of Fig. 13 and the surrounding earth showing as a modification of the invention the sinking of the casing as part of the permanent pile structure.

While the high pressure intrusion of a pile as described in connection with Figs. 15 through 17 contemplates the performance of the operation with the casing sunk or driven into position in the earth 45, it is also intended for use in the preforming of concrete piles above ground in the open, such piles to be subsequently sunk into position by driving, jacketing, and other methods known in the art. When preforming piles in this manner, an end closure similar to the cover plate 64 is provided for the remote or bottom end of the casing 62, the opening 71 of the closure plate being plugged or omitted. The filling and compacting of the aggregate 63 may in such case, and after inserting the tube 29 into the casing, be effected by tamping the same with the casing in an upright position and while it is being progressively filled, a tamper such as that indicated at 32 (Fig. 6) being employed or the aggregate may be compacted by supporting the casing 62 in an upright position during the filling thereof and pounding or hammering the casing as the aggregate is introduced therein. Alternatively, or in addition to the pounding or hammering, the casing may be agitated to shake down or compact the aggregate during the filling.

Figure 18:
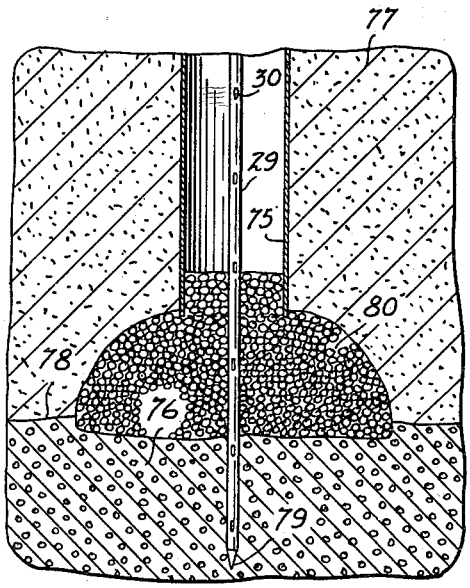
Figs. 18 and 19 are diagrammatic vertical sectional details through the bottom of a pile casing or shell and the surrounding earth showing successive steps in the formation of a large base on a pile in a non-intrudable clay soil or similar stratum.
Figure 19:
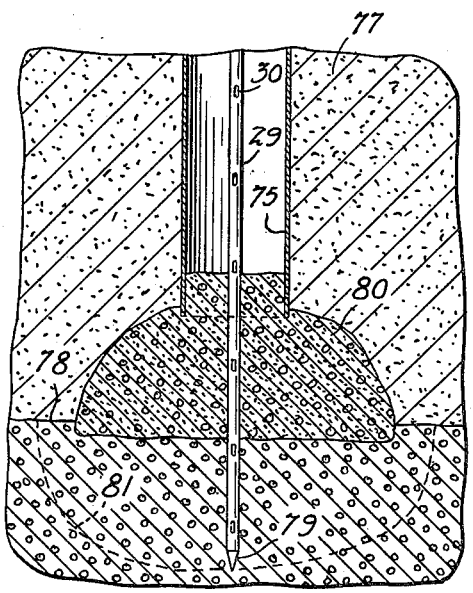

In Figs. 18 and 19 is illustrated an application of the process of the present invention to the formation of a pile in earth which includes a non-intrudable stratum such as clay or loam located at or adjacent the bottom of the pile. A tubular metal shell or casing 75, which may be like one of the shells 14 or 40 or the casing 62 previously described, is sunk to the desired depth. The lower end thereof may be adjacent or slightly above an intrudable stratum 76 of gravel, graded aggregate, sand or the like, the earth above the stratum 76 and immediately surrounding the bottom of the casing being the non-intrudable clay or the like indicated at 77. An enlarged base or footing cavity is jetted out of the clay at the bottom of the casing 75 as by the method described in connection with Fig. 14, using the adjustable jet nozzle 59. This footing cavity is made to have a cross sectional area several times that of the pile casing 75, preferably being at least twice the diameter of the casing and having a height at least substantially equal to the casing diameter. If the lower end of the casing 75 terminates above the upper boundary 78 of an intrudable stratum 76 (as illustrated) the footing cavity is enlarged sufficiently to extend downward to the intrudable stratum. A grout distributing tube which may be the same as the tube 29 previously described is lowered through the casing 75 to extend below the bottom of the casing and preferably is driven into the intrudable stratum 76 below the footing cavity, if such a stratum exists, a distance at least substantially equal to the diameter of the casing 75. To facilitate this driving of the grout tube the end of the latter may be fitted with a sharpened plug 79.

After the driving of the grout tube 29 an initial quantity of graded aggregate 80 is placed in the enlarged footing cavity in the manner previously described and this aggregate is tamped solidly in place to completely fill the cavity. Thereafter, the casing 75 is progressively filled with serially introduced quantities of the aggregate individually tamped as previously explained. After the complete filling of the pile a grout conduit, such as the conduit 33, is inserted through the foraminous tube 29 so that grout under high pressure may be progressively introduced first into the intrudable stratum 76 below the aggregate 80 and the enlarged footing cavity and then upwardly into the compacted aggregate in the casing 75. Intrusion of the stratum 76 is continued until the grout is estimated to extend over a zone beyond the periphery of the aggregate filled enlarged base footing cavity of the pile. For example, the stratum 76 may be intruded so that the grout extends as far as the broken lines 81 of Fig. 19. After the intrusion of the stratum 76 the grout conduit is progressively withdrawn through the tube 29 while the feeding of grout to the latter under high pressure is continued. In this manner the compacted aggregate in the enlarged base cavity and extending upwardly continuously through the entire length of the casing 75 is progressively filled with the intruded grout so that upon hardening of the grout a solid monolithic structure is provided which is continuous from below the excavated footing cavity to the top of the pile. The grout distributing tube 29 is left in the pile and may be filled with aggregate to form concrete therein.

Figure 20:
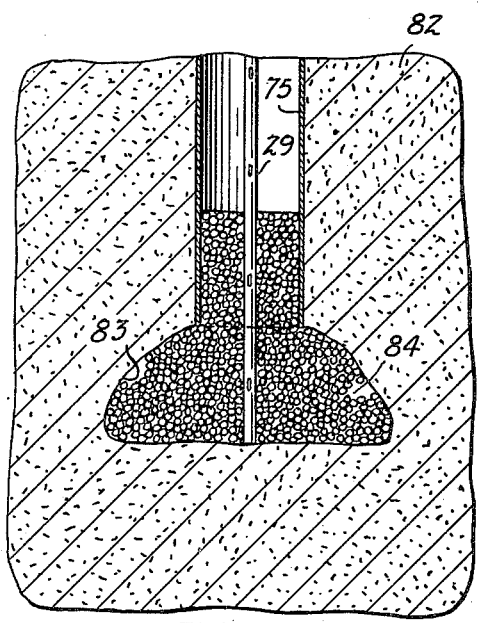
Figs. 20 and 21 are diagrammatic vertical sectional details through the bottom of a pile casing or shell and the surrounding earth illustrating steps in the process of forming a multipart enlarged base on a pile.
Figure 21:
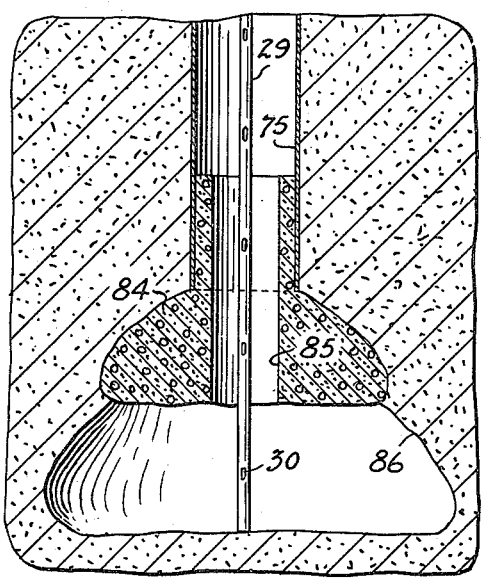

In Figs. 20 and 21 is illustrated another application of the invention to the forming of a pile in non-intrudable earth. The casing 75 is in this case sunk to the desired depth in the non-intrudable earth indicated at 82, and which may be clay, loam, or the like. By the process previously described an enlarged base or footing cavity is jetted out at the bottom of the casing 75 so as to have a relative size and shape such as that indicated by the outline 83 (Fig. 20). This primary cavity has a horizontal cross sectional area several times that of the pile casing 75, the diameter of the cavity being at least about twice the diameter of the casing. The height of the cavity is also at least approximately equal to the diameter of the casing.

The grout distributing tube 29 is lowered through the casing 75 and positioned centrally therein. The bottom of the tube extends beyond the bottom of the casing 75 so that an initial quantity 84 of aggregate positioned in the base cavity and compacted in the manner previously described may be intruded through the bottom of the tube 29. The latter may be withdrawn after intrusion and before the grout hardens. This initial quantity of aggregate extends upwardly into the casing 75 a substantial distance such as a distance approximately equal to the diameter of the casing so that upon solidification of the intruded aggregate 84 the latter is frictionally locked into the lower end of the casing and constitutes a primary base or footing therefor. After solidification of the intruded initial quantity of aggregate 84, a central passage 85 is drilled therethrough. Suitable jetting tools such as the conduits 49 and 55 are inserted through this passage to jet out or excavate below the intruded and solidified primary footing a supplemental footing or base cavity the outline of which is indicated at 86. The supplemental base cavity located below the primary base 83 is of greater cross sectional area than the latter to provide a larger footing area for the pile. The solidified aggregate in the primary base cavity acts as a ceiling or roof for the supplemental cavity 86 during the jetting out or formation of the latter and while the latter is being filled with aggregate.

Prior to the introduction of aggregate into the supplemental base cavity the grout distributing tube 29 is reinserted into the casing 75 and extended downwardly below the bottom of the casing through the passage 85 in the primary base of the pile and into the supplemental base cavity 86. After the filling of the supplemental base cavity 86 with graded aggregate which is compacted therein, the entire length of the casing may then be filled with graded aggregate compacted in the manner previously mentioned. The highly flowable liquid grout is then intruded into the aggregate under high pressure beginning with the aggregate in the supplemental base cavity 86 and thence progressively upward throughout the entire length of the pile to form, upon hardening, a monolithic pile structure having a bearing base of relatively large cross sectional area.

The base of the pile may be further enlarged and extended by forming additional sub-bases below the cavity 86 in accordance with the process just described. In such case the aggregate is compacted and intruded in the cavity 86 but the casing is not filled until the bottommost footing cavity is completed. The grout tube 29 is withdrawn after intrusion of the aggregate in the supplemental cavity 86 and thereafter a passage corresponding to the passage 85 in the primary base is formed through the supplemental base in the cavity 86. The jetting tools are passed through such passage to form still another enlarged base cavity below the supplemental base. The filling with aggregate and intruding thereof is repeated in the manner described to form a substantially continuous structure extending monolithic through the primary base.

Figure 22:
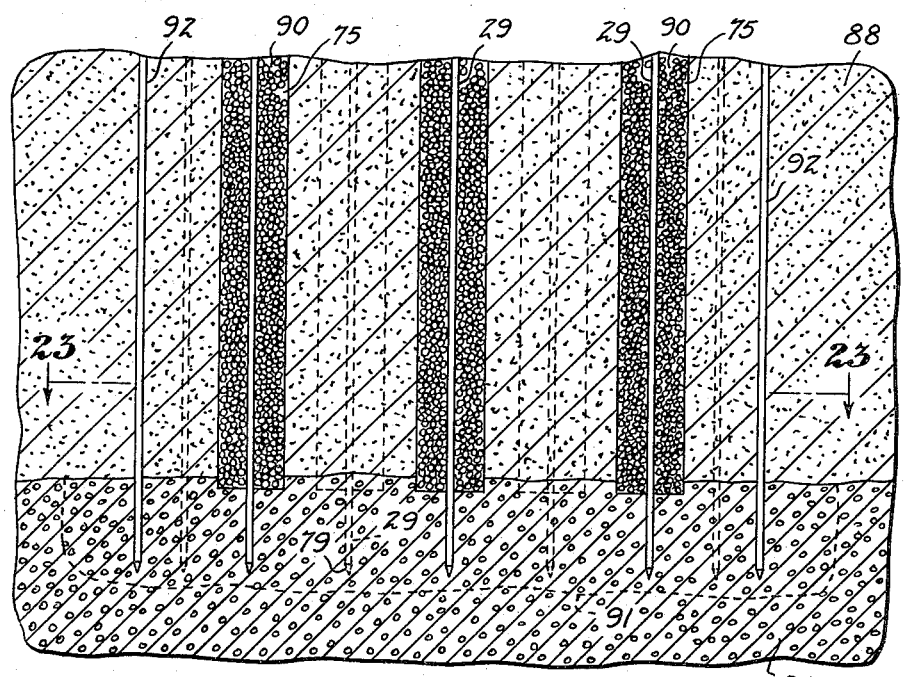
Fig. 22 is a diagrammatic vertical sectional detail illustrating a structure incorporating a plurality of piles adjacent one another and having their bottom ends disposed in an underlying intrudable zone or stratum.
Figure 23:
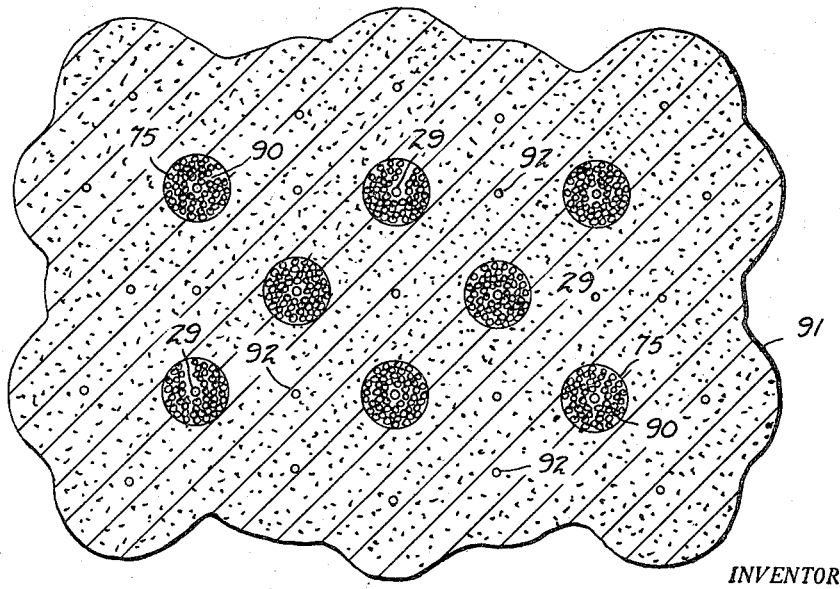
Fig. 23 is a diagrammatic sectional view taken substantially along the line indicated at 23—23 of Fig. 22.

In Figs. 22 and 23 is diagrammatically illustrated an application of the present invention to group piling. To provide a footing or base to carry a concentrated load such as is encountered in a building column or bridge pier a number of casings or shells such as the casings 75 are sunk or driven through an overlying earth stratum 88 into or adjacent an intrudable stratum 89 of gravel, stone, sand, or the like. The casings 75 may be the same as the shells 14 or 40 or the casing 62 previously described. A grout distributing foraminous tube 29, having the pointed end cap or plug 79, is lowered through each of the casings and driven into the intrudable stratum 89 below the bottoms of the casings. The casings are then filled with compacted aggregate 90. Intrusion of the structure is initiated at the bottom of one of the driven tubes 29 and continued in a progressive manner upwardly throughout the length of each of the aggregate filled casings 75.

The intrusion through the bottoms of the tubes 29 which are imbedded in the intrudable stratum 89 is performed with pressures sufficiently high to force the highly flowable liquid grout laterally through the stratum. The intrusion of the underlying stratum 89 is continued until refusal or preferably until the grout from one of the tubes 29 meets and comingles with the grout from one of the adjacent tubes 29. This intrusion of the structure may be made using a single grout supplying condit 33 (not shown in Figs. 22 and 23) which is inserted sequentially in each of the several grout distributing tubes 29. Preferably a plurality of the grout conduits 33 are used so that several or all of the foraminous tubes 29 may be supplied simultaneously with high pressure grout.

A unitary or monolithic pile structure is thus produced upon solidification of the grout. The bottom ends of the several piles are continuous with a solid grout intruded base area, the outline of which is indicated at 91 and which underlies the entire area of the foundation structure. Such a foundation may be readily constructed at relatively low cost and provides an extremely safe support for high load concentrations.

In certain instances, as when the intrudable stratum 89 is rather dense and resists intrusion, it may be desirable to drive supplemental grout distributing tubes 92 in the spaces between and around the pile casings 75. These tubes 92 are in the form of steel pipes which are driven through the earth and into the intrudable stratum 89. They are fitted with strainer points on their bottom ends or are formed with narrow elongated slots at their bottom ends similar to the slots 30 in the tubes 29 through which grout may be forced into the intrudable stratum. The grout forced through the supplemental tubes 92, preferably simultaneously with the forcing of the grout through the tubes in the casings 75, flows into and comingles with the grout from all of the other tubes in the stratum 89 so as to provide a monolithic base within the area 91.

To satisfy a requirement for a pile structure similar to that illustrated in Figs. 22 and 23 when the earth at the site does not include an intrudable stratum, a satisfactory foundation of unitary character can be made by placing adjacent one another a number of piles such as those illustrated in Figs. 18 through 21. When proceeding in accordance with this variation of the invention the piles are located sufficiently close together so that the enlarged bases thereof, such as the bases 80 and 84 previously mentioned, contact one another. By this arrangement the piles collectively provide a single large base or footing which, although not necessarily monolithic in character, is continuous over the entire footing area of the structure. In some instances, when providing the enlarged bases on the bottoms of the piles, it is advantageous to form the footings first on every other or alternate pile, allowing these enlarged bases to set or harden before jetting out the excavations for the enlarged bases on the intervening piles. Such a procedure avoids possible caving of the overlying earth and permits a bond to be effected between the enlarged bases of adjacent piles.

The process and apparatus of the present invention comprises certain basic concepts which permit adaptation of the invention to complex foundation problems encountered in practice. With relatively simple apparatus the particular conditions of any installation can be satisfied and the type of pile or base structure desired can be provided having the necessary characteristics of strength and rigidity.

The principles of the present invention may be utilized in various ways, modifications and alterations being contemplated, substitution of parts and changes in construction being resorted to as desired, it being understood that the embodiments shown in the drawings and described above and the particular methods set forth are given merely for purposes of explanation and illustration without intending to limit the scope of the claims to the specific details disclosed.

What I claim is:

1. Means for forming a pile comprising a tubular metal casing, a mandrel having one end receivable within the casing in spaced relationship with the walls of the latter, a cylindrical sheet metal pile sheath contained within and supported by the casing, means supported by the casing and having connection with the mandrel for supporting the latter with one end thereof disposed within the casing, and other means supported by the casing and having connection with the sheath for supporting the latter with its upper end in the space between the mandrel and the casing.

2. Means for sealing the end of a tubular metal pile casing for high pressure intrusion of the latter comprising a closure member disposable across the end of the casing, a U-shaped member for straddling the closure member and having leg portions for extending alongside the casing, means for attaching the leg portions of the U-shaped member to the casing, a deformable gasket receivable between the closure member and the casing end, and wedging means receivable between the U-shaped member and the closure member to hold the latter against the end of the casing.

3. Means for sealing the end of a tubular metal pile casing for high pressure intrusion of the latter comprising a closure member disposable across the end of the casing, a U-shaped member disposable across the end of the casing for straddling the closure member and having leg portions extending alongside the casing, means for attaching the leg portions of the U-shaped member to the casing, a deformable gasket receivable between the closure member and the casing end, wedging means receivable between the U-shaped member and the closure to hold the latter against the end of the casing, and aligned openings through the closure member and the U-shaped member to receive a conduit for carrying fluid grout into the pile.

4. Intrusion apparatus comprising a foraminous tube for embedment in an aggregate mass, a grout supplying conduit receivable telescopically in the tube and movable to different positions therein, the conduit having a grout outlet, and gasket means carried by the conduit adjacent the grout outlet to provide a seal between the conduit and the tube for restricting the flow of grout from the conduit to a limited number of tube foramina adjacent the outlet of the conduit whereby grout can be selectively supplied to different zones of aggregate along the length of the tube.

5. The method of forming a pile in the earth comprising sinking a tubular shell, forming a first cavity in the earth at the bottom of the shell of larger cross sectional area than the shell, filling the cavity with concrete to form a large base, forming a second cavity below the first, filling the second cavity with aggregate, and intruding the aggregate with grout to provide a solidified supplemental base underlying the first base, and filling the shell with concrete.

6. The method of forming a pile structure in earth which includes a sub-surface intrudable mass comprising sinking a plurality of hollow tubular shells into the earth to the intrudable mass and in spaced generally upright relation, filling the shells with aggregate and intruding a fluid cementitious material through the shells and into the intrudable mass underlying the several shells at pressures sufficiently high to cause the cementitious material from adjacent shells to flow together to form a continuous concrete base under the several shells and intruding additional cementitious material into the aggregate in the shells in a continuous operation subsequent to the intruding of the underlying stratum to form in the shells a plurality of concrete columns monolithic with the base.

7. The method of forming a pile structure in earth which includes a sub-surface intrudable mass, comprising sinking a plurality of hollow tubular shells into the earth in horizontally spaced-apart generally upright relation and downwardly to points adjacent said intrudable mass, projecting conduits from adjacent the surface downwardly through the shells and into said intrudable mass below the bottoms of the shells, filling the shells with aggregate, forcing grout under pressure through said conduits into said intrudable mass to solidify the same and form a single substantially monolithic base extending continuously under said plurality of shells, and forcing grout under pressure from said tubes into said aggregate to solidify the same and bond the solidified aggregate to said base to form a plurality of piles substantially monolithic with a common solidified base.

8. The method of forming a pile in the earth, comprising projecting a tubular pile sheath downwardly into the earth, projecting a foraminous tube downwardly through said pile sheath from adjacent the surface to a point adjacent the lower end of said pile sheath, the foramina of said inner tube being disposed at spaced locations along substantially its entire length, filling the annular space between said pile sheath and said foraminous tube with aggregate, projecting a grout conduit downwardly through said foraminous tube to adjacent the lower end thereof, forcing grout under pressure downwardly through said grout conduit and directing it outwardly through foramina adjacent the lower end of said foraminous tube, raising said grout conduit stepwise and directing grout therefrom through progressively higher foramina in said foraminous tube for intruding the grout into said aggregate to fill the voids therein progressively from the bottom of said sheath upwardly to the top thereof, and completely withdrawing said grout conduit and leaving said foraminous tube in the finished pile as reinforcement therefor.

9. The method of forming a pile in earth which includes a sub-surface intrudable mass, comprising projecting a tubular pile sheath downwardly through the earth from adjacent the surface to adjacent said intrudable mass, projecting a foraminous tube downwardly through said pile sheath from adjacent the surface to a point below the lower end of said pile sheath, the foramina of said inner tube being disposed at spaced locations along substantially its entire length, filling the annular space between said pile sheath and said foraminous tube with aggregate, projecting a grout conduit downwardly through said foraminous tube from adjacent the surface to adjacent the lower end of the foraminous tube, forcing grout under pressure downwardly through said grout conduit and directing it outwardly through foramina adjacent the lower end of said foraminous tube and into said intrudable mass to solidify the same, raising said grout conduit stepwise and directing grout therefrom through progressively higher foramina in said foraminous tube and into the surrounding aggregate for filling the voids therein progressively from the bottom upwardly to the surface, completely withdrawing said grout conduit, and leaving said foraminous tube in the finished pile as reinforcement therefor after setting of the grout.

10. The method of forming a pile in earth which includes a sub-surface intrudable mass, comprising projecting an outer tubular shaft downwardly through the earth from adjacent the surface to adjacent said intrudable mass, said outer tubular shaft containing a tubular pile sheath substantially coextensive therewith, projecting a foraminous tube downwardly through said pile sheath from adjacent the surface to a point below the lower ends of said tubular shaft and said pile sheath, the foramina of said foraminous tube being disposed at spaced locations along substantially its entire length, filling the annular space between said pile sheath and said foraminous tube with aggregate, projecting a grout conduit downwardly through said foraminous tube from adjacent the surface to adjacent the lower end of the foraminous tube, forcing grout under pressure downwardly through said grout conduit and directing it outwardly through foramina adjacent the lower end of said foraminous tube and into said intrudable mass to solidify the same, raising said grout conduit stepwise and directing grout therefrom through progressively higher foramina in said foraminous tube and into the surrounding aggregate for filling the voids therein progressively from the bottom upwardly to the surface, completely withdrawing said grout conduit, leaving said foraminous tube in the finished pile as reinforcement therefor, and withdrawing said outer tubular shaft from around the finished pile at a stage in the process during or after filling said annular space with aggregate.

11. The method of forming a pile in earth which includes a sub-surface intrudable mass, comprising projecting an outer tubular shaft downwardly through the earth from adjacent the surface to adjacent said intrudable mass, said outer tubular shaft containing a tubular pile sheath substantially coextensive therewith, projecting a foraminous tube downwardly through said pile sheath from adjacent the surface to a point below the lower ends of said tubular shaft and said pile sheath, the foramina of said foraminous tube being disposed at spaced locations along substantially its entire length, filling the annular space between said pile sheath and said foraminous tube with aggregate, withdrawing said outer tubular shaft gradually as the pile sheath is being filled with aggregate and simultaneously employing the outer tubular shaft as a ram to tamp earth around the pile sheath as the aggregate level therein is raised, projecting a grout conduit downwardly through said foraminous tube from adjacent the surface to adjacent the lower end of the foraminous tube, forcing grout under pressure downwardly through said grout conduit and directing it outwardly through foramina adjacent the lower end of said foraminous tube and into said intrudable mass to solidify the same, raising said grout conduit stepwise and directing grout therefrom through progressively higher foramina in said foraminous tube and into the surrounding aggregate for filling the voids therein progressively from the bottom upwardly to the surface, completely withdrawing said grout conduit, leaving said foraminous tube in the finished pile as reinforcement therefor, and withdrawing said outer tubular shaft from around the finished pile at a stage in the process during or after filling said annular space with aggregate.

JOHN R. MONTAGUE.

REFERENCES CITED

The following references are of record in the file of this patent:

UNITED STATES PATENTS

| Number | Name | Date |
| --- | --- | --- |
| 1,642,213 | Neelands | Sept. 13, 1927 |
| 2,050,215 | Watt | Aug. 4, 1936 |
| 2,337,378 | Disney | Dec. 21, 1943 |
| 2,412,239 | Weber | Dec. 10, 1946 |